(12) United States Patent
Impero

(10) Patent No.: US 8,354,175 B2
(45) Date of Patent: Jan. 15, 2013

(54) METAL PANEL WITH CELLULAR STRUCTURE, RELATED MANUFACTURING PROCESS, AND USE IN AN IMPACT ENERGY ABSORBER

(76) Inventor: Pasquale Impero, Casalnuovo di Napoli (IT)

( * ) Notice: Subject to any disclaimer, the term of this patent is extended or adjusted under 35 U.S.C. 154(b) by 212 days.

(21) Appl. No.: 12/747,940

(22) PCT Filed: Dec. 5, 2008

(86) PCT No.: PCT/IT2008/000745
§ 371 (c)(1),
(2), (4) Date: Jun. 14, 2010

(87) PCT Pub. No.: WO2009/078052
PCT Pub. Date: Jun. 25, 2009

(65) Prior Publication Data
US 2010/0279140 A1    Nov. 4, 2010

(30) Foreign Application Priority Data

Dec. 14, 2007  (IT) .............................. RM2007A0644

(51) Int. Cl.
*B32B 3/12* (2006.01)
*B23K 31/02* (2006.01)
(52) U.S. Cl. .................... 428/593; 228/181; 219/137 R; 29/428; 29/525.06; 29/897
(58) Field of Classification Search ........................ None
See application file for complete search history.

(56) References Cited

U.S. PATENT DOCUMENTS

| | | | | |
|---|---|---|---|---|
| 2,609,068 A | * | 9/1952 | Pajak | 428/118 |
| 2,910,153 A | * | 10/1959 | Campbell | 428/589 |
| 2,959,257 A | * | 11/1960 | Campbell | 428/116 |
| 3,028,481 A | * | 4/1962 | Covert | 219/80 |
| RE25,704 E | | 12/1964 | Van Pappelendam | |
| 3,162,745 A | * | 12/1964 | Rohr | 219/83 |
| 3,320,399 A | | 5/1967 | Luthi | |
| 3,639,106 A | * | 2/1972 | Yate | 428/593 |
| 3,971,243 A | * | 7/1976 | Jones | 72/385 |
| 4,091,649 A | * | 5/1978 | Johnson | 72/183 |
| 4,471,013 A | * | 9/1984 | Welzen | 428/116 |
| 4,608,845 A | * | 9/1986 | Campbell | 72/44 |

(Continued)

FOREIGN PATENT DOCUMENTS

CA    1022082 A    12/1977

(Continued)

OTHER PUBLICATIONS

International Search Report, Aug. 2009.

*Primary Examiner* — John J Zimmerman
(74) *Attorney, Agent, or Firm* — William J. Sapone; Coleman Sudol Sapone P.C.

(57) ABSTRACT

Metal cellular panel (8) constituting a semifinished product formed by various corrugated plate half shells (1, 1') wherein all the contact points between the half shells (1, 1') are welded or riveted, and preferably the axial height (b) of the cells of the panel (panel thickness) does not exceed the maximum diameter of the cells. The panel production process ensures maximum flexibility, since it is adaptable to various cell shapes, various pitches between the cells, and various cell heights (h) (measured in the plane of the panel).

17 Claims, 15 Drawing Sheets

U.S. PATENT DOCUMENTS 6,557,389 B1 * 5/2003 Listak et al. .................... 72/420

FOREIGN PATENT DOCUMENTS

| | | |
|---|---|---|
| DE | 1231538 B | 12/1966 |
| EP | 1054183 A | 11/2000 |
| EP | 1464547 A | 10/2004 |
| FR | 1235802 A | 7/1960 |
| FR | 1389080 A | 2/1965 |
| FR | 1481677 A | 5/1967 |
| FR | 2829416 A | 3/2003 |
| GB | 836489 A | 6/1960 |
| GB | 1390968 A | 4/1975 |
| GB | 2083162 A | 3/1982 |
| JP | 61046334 A | 3/1986 |

* cited by examiner

METAL PANEL WITH CELLULAR STRUCTURE, RELATED MANUFACTURING PROCESS, AND USE IN AN IMPACT ENERGY ABSORBER

FIELD OF THE ART

The present invention refers to a metal panel with cellular structure, preferably hexagonal, which can be used as a semi-finished product for various uses, particularly as impact energy attenuator. The present invention also regards a process for making such panel.

PRIOR ART

Various honeycomb, i.e. cellular structures are known in the art, for example made of thermoplastic materials, obtained with an extrusion process.

Cellular structures are described for example in GB 2 305 487 and WO 02/16171 Al (=PCT/GB01/03704). Such structures in reality form hexagonal honeycomb blocks and not hexagonal honeycomb panels, and serve for absorbing the impact energy in the axial extension direction of the cells. These structure are obtained by welding a plurality of shaped metal plates (in the case of the patent GB 2 305 487) or thermoplastic material plates (PCT/GB01/03704) and have a use strictly limited to the described application. Moreover, the various elementary layers of these structures, composed of two coupled (welded) corrugated half-plates, can be welded or riveted together only at the ends in order to form the structure, it being impossible to penetrate into the long honeycomb cells. In some cases, however, this could be disadvantageous for the structure strength. Actually, the patent GB 2 305 487 does not mention the mariner in which the welding process is carried out, or the type of welding employed, limiting itself to the description of the product as is (FIG. 3 and related prior art of FIG. 1), and its effects (FIG. 9 (prior art) and FIG. 10 (innovation)), nor is it described how the welding process between the plates could be optimized with regard to costs and time.

The present invention, with regard to the product and its use, stands out from the previous hexagonal honeycomb structures.

In addition, the welding is carried out cell by cell with a quick and optimized process. The strength of the panel opposing the impact force can be modulated in the direction of the panel plane, given the same cell size, by means of the expedients described below. The production process of the panel thus results rather flexible and adaptable to the various application needs.

On the other hand, the German patent DE 3809470 describes an impact energy absorber for road barriers. In this case, the structure is in fact circular and honeycomb, the diameter of the circular cells (tube sections) is substantially equal to the height of the same (as results from FIG. 1 of that patent). Nevertheless, the production process is rather different from that of the present invention. Indeed, a panel of the absorber described in DE 3809470 is formed by various tubes which are subsequently welded together. Thus, the working process upstream consists of the known manufacturing techniques of metal tubes (for example, starting from a metal plate), which will be subsequently welded in order to form the honeycomb structure.

Indeed, the impact force is transverse to the tubes (see FIG. 1), as in the specific case of application of the panel of the present invention to an impact energy absorber. Nevertheless, special expedients are not described for modulating the strength of the absorber tubes given their same diameter and thickness.

DESCRIPTION OF THE INVENTION

In a first aspect thereof, the present invention regards a metal panel with honeycomb structure, preferably hexagonal, in which the transverse size of the cell (in the cell section plane), i.e. the maximum diameter of the cells, is preferably not less than the axial height of the cells themselves and at the very least is preferably substantially equal to the height of the various cells. The panel of the invention consists of a semi-finished product that can be used for various applications, mainly as a component in an impact absorber, in which the impact occurs in the direction of the plane of the cells (hexagonal, for example), as in the case of the abovementioned patent DE 3809470. Nevertheless, in the present patent, the panel is formed by various half-shells fixed together. The manufacturing process is therefore totally different. Every pair of half-shells forms an elementary component of the panel. The fixing occurs cell by cell. One thus obtains a panel that is particular stable (strong). Preferably, the fixing between the various cells occurs with a welding process (spot welding or continuous welding). In particular, it is preferable to use a projection welding process, in which the electrical current is made to pass between the cell wall pairs of the half-shells to be welded, directing and concentrating the electrical current in the contact points between the walls, previously obtained by forming embossments at the future welding points.

A particular important feature of the present invention consists of the fact that on the walls and/or on the corners of the cells (possible also only on a subset of all the panel cells), ribs (drawings) can be formed so to obtain different panel deformation progressions (for example, in the case of use of the semifinished panel as impact energy absorber). Thus, a conditioning can be obtained in accordance with the technical objects to be attained. The manufacturing process of a panel of the present invention is thus rather flexible, since such ribs can already be made during the molding of the plate at the press. As said above, one can in particular affect the direction of the deformation, providing for ribs only on part of the cells. The ribs can be made after having produced the "rough" honeycomb panel, or (and this forms the preferred solution already indicated above) they can be obtained on the walls of the cells during the actual production process, i.e. in combination with the shaping (molding at the press) of the single half-shells constituting (in pairs) the elementary components or "layers" of the panel.

Preferably, the welding process occurs in subsequent portals (or in welding stations) equipped with the respective welding means, each of these portals (or welding stations) simultaneously carrying out the welding on various cells, according to the following scheme:

portal 1: welding in positions 1, n, 2n−1, 3n−2 . . .
portal 2: welding in positions 2, n+1, 2n, 3n−1 . . .
. . .
portal n: welding in positions n−1, 2n−2, 3n−3, . . .

This allows suitably arranging the various electrical voltage transformers in the various welding stations and optimizing the entire panel obtainment process.

Preferably, the panel is made by first forming the various half-shells (by means of molding at the press or roller forming of a flat metal plate). In the molding process at the press, the embossments for the welding are also simultaneously formed (if it is desired that the fixing between half-shells occurs by means of projection welding). In the case of the roller forming, the embossments are subsequently made, of course before the projection welding. Then, the half-shells are joined in pairs in an automated manner [welding (preferred solution), riveting, or other]. Welding remains the quickest process and is thus preferred. Subsequently, another welding machine of the production line welds together the half-shell pairs, one at a time, obtaining the panel with the desired length. Alternatively, also in this assembly operation of the pairs for forming the panel, one can for example use an automated riveting machine.

The process terminates with the finishing (for example painting) of the panel.

With regard to a possible application of the semifinished product (panel) according to the present invention, it must be observed that various panels of the present invention can be combined together, for example flanked, in order to obtain a decelerator adapted to absorb a specific impact/load. Thus, due to the flexibility of the production process, not only can one affect the deformation by providing for different thicknesses of the plate, different sizes of the cells, different pitches between the cells, and ribs at the corners of the cells and/or at their sides, but one can also adapt the formation of the absorber as a function of the load, by varying the number of panels composing the absorber. This certainly represents a further difference with respect to the prior art. In addition, the panels of the panel "pack" which forms the absorber can be spaced from each other (air space) or in mutual contact with each other, or elements can be inserted between every panel (plates, for example, possibly welded to the ends of the two adjacent panels, etc.). The thickness of the elements inserted between the single cellular (honeycomb) panels can be varied depending on the applications.

BRIEF DESCRIPTION OF THE DRAWINGS

The present invention will now be described only as a non-limiting example, making reference to the attached drawings, wherein.

DETAILED DESCRIPTION OF THE PREFERRED EMBODIMENTS

Figure 1:
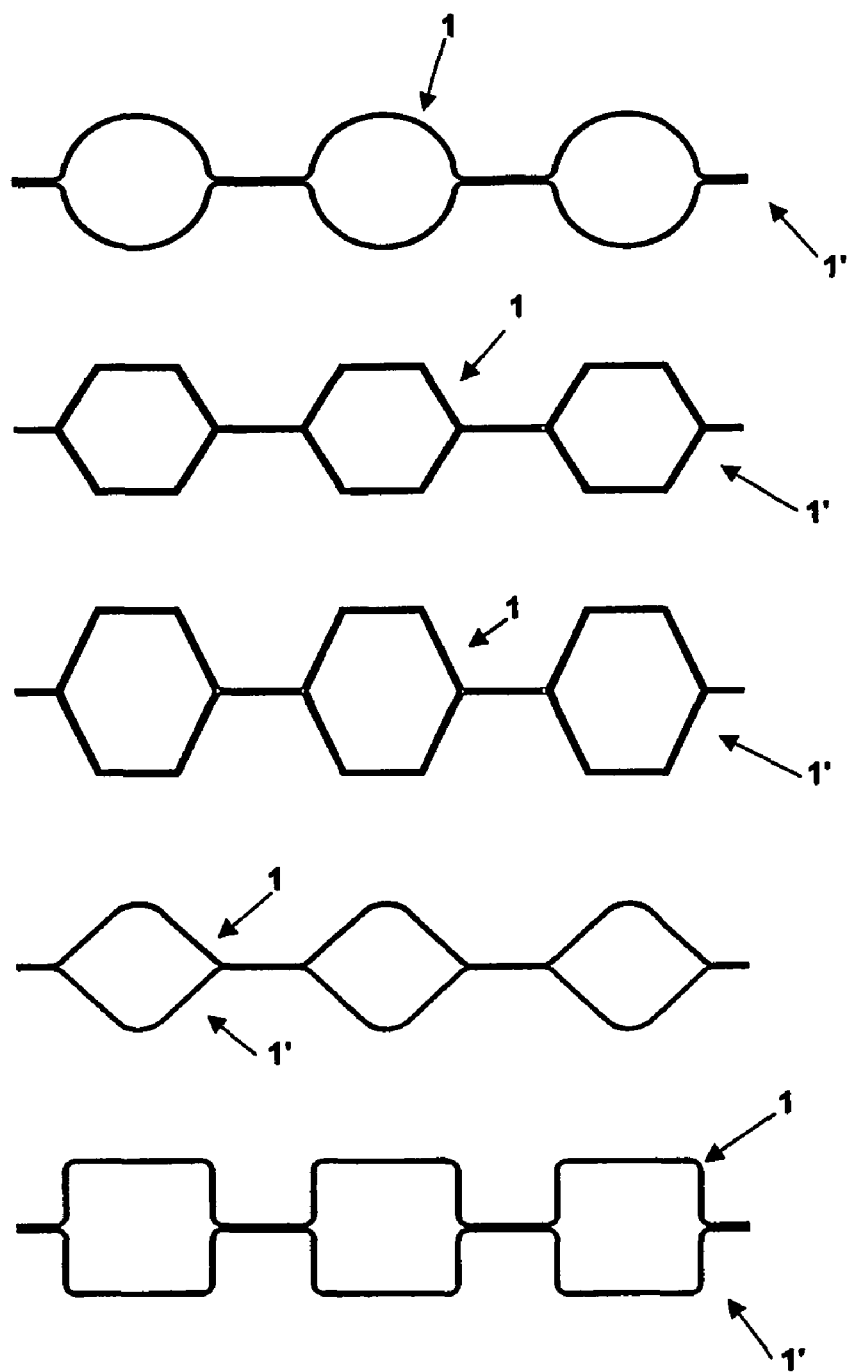
FIG. 1 shows in section (in the cell plane) several typical embodiments of the elementary component of the panel (composed of two shaped plate half-shells), in which the preferred hexagonal form is observed in the center.

FIG. 1 shows, in section, the form of a pair of half shells 1,1' for making the cellular metal panel, the subject of the present invention. The cells can be of various shape, as shown in FIG. 1, but the hexagonal form is that preferred. The half shells are obtained from a metal plate coil in the manner described below. The half shells 1, 1' . . . are welded or riveted together, and the panel is in turn formed by connecting, by means of rivets or welding or the like in the contact points or surfaces 3, different elementary components (panel layers) 2, 2', . . . individually formed from a pair of half-shells 1, 1' (as is shown in particular in FIG. 2).

Figure 5:
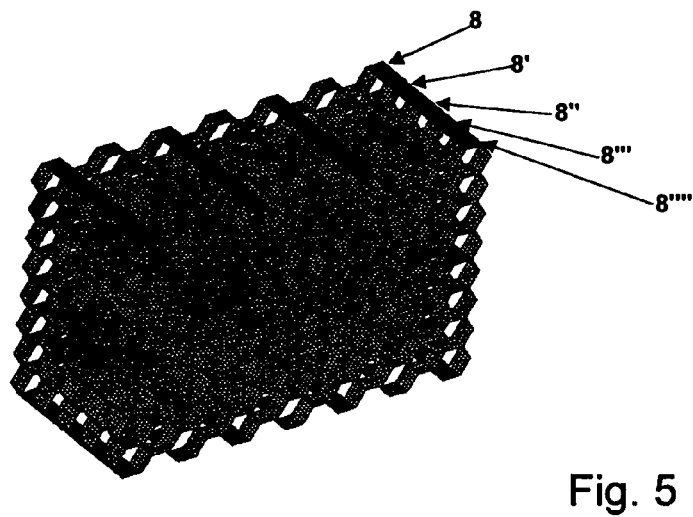
FIG. 5 shows a decelerator according to the invention, comprising various panels made with the process of the present invention.

The thickness of the panel, which corresponds to the height of the same cells in the axial direction of the cells, is preferably less than or substantially at most equal to the width of the cells (or maximum diameter of the cells). Indeed, since the impact energy (in the particular case of the main application related to an impact energy absorber) must be absorbed along the surface/plane of the cells and not in the axial direction of the cells, as in the case of the patents GB 2 305 487 and WO 02/16171 A1 (=PCT/GB01/03704), the greatest size is the width of the panel and not the depth. If desired, as said, one can use several parallel flanking panels (see FIG. 5).

Figure 2:
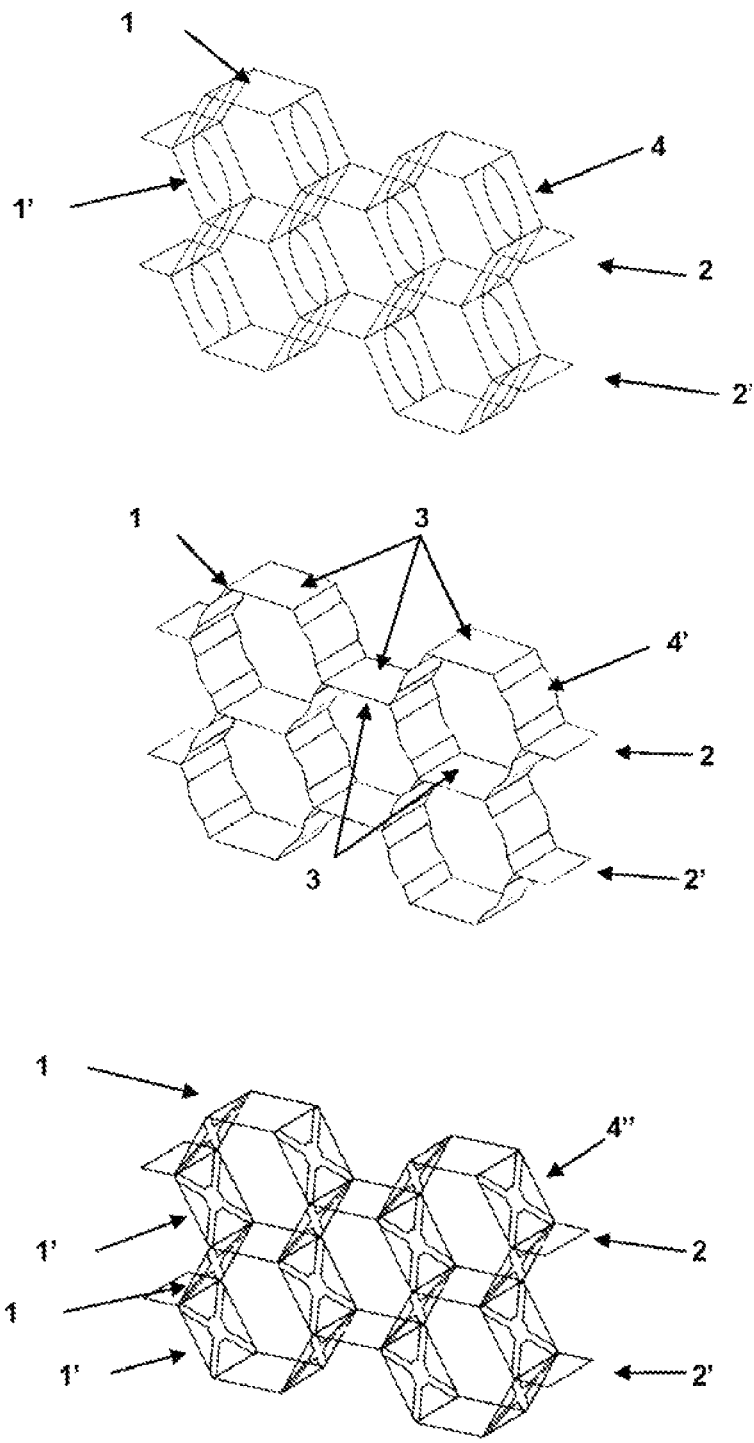
FIG. 2 shows, in accordance with a perspective view, two half-shell pieces coupled together, with several possible rib forms, in the case of a panel with hexagonal cells (the ribs or drawing projects could also be alternatively or additionally made in the corners of the cells, even if this is not shown in FIG. 2)

Another important feature of the present invention is that the panel strength can be modified, causing a different deformation progression, by providing for ribbing of various form, 4, 4', 4" etc. as indicated in FIG. 2. Such ribbing or ribs can also be formed at the corners of the single half shells, so that the panel would offer a greater compressive strength.

The process is characterized in that all the mating surfaces 3, 3 between the two half shells 1, 1' are fixed together. Since the panel has reduced depth (p) with regard to the lateral extension (1) of the cell, i.e. since preferably $p \leq 1$ or $p \approx 1$, by providing for several embossments 5, 5 (drawing or molding projections, see FIG. 3) uniformly distributed on the surfaces 3, 3, it is possible to easily weld two surfaces 3, 3, and this can be easily made in the production line for all the surfaces 3, 3 of the adjacent half-shells, making the panel with uniform strength.

The thickness "s" of the plate of the single half shells 1, 1' composing the cellular metal panel and the "1" plane dimensions of the cells, as well as the width "d" of the finished panel composed of a number N of layers (elementary components or pairs of half shells 1, 1'), are parameters that can be defined each time as a function of the specific application type intended for the panel.

The cells of the cellular panel are obtained by means of coupling, with an automatic welding system (spot welding or continuous welding) or with another automatic mechanical system (punching, riveting, etc.), plate strips that have been previously shaped (with a plastic deformation process) so to form the half shells 1, 1'. If the plastic deformation process is roller forming, the formation of the embossments 5 via projection welding (preferred welding process) occurs in the plate cutting station (see below). If, however, the plastic deformation process is obtained with a bending process, the execution of the embossments 5 (plate embossing) preferably already occurs in the bending step of the plate at the press, in the molding/bending station of the plate (see below).

It is evident, then, that the electrodes of a welding gun can easily and precisely weld the surfaces 3, 3 by employing, for example, 4 embossments 5, 5, 5, 5 distributed at the corners of a surface 3.

Figure 3:
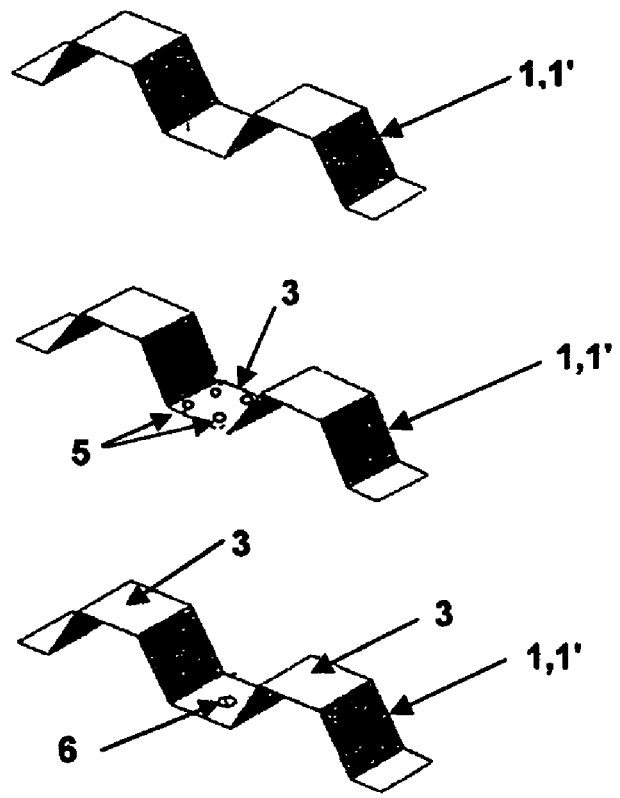
FIG. 3 (perspective view) shows, above, a half-shell piece which encloses or rather extends over two hexagonal cells; in the center, the same half-shell is shown with three embossments for the projection welding; below, the same half-shell is shown with a hole for the insertion of a rivet.

Also shown in FIG. 3 (below) is a hexagonal half shell 1 or 1' in which a hole 6 was made (for example during the plastic deformation of the plate at the press) for allowing the subsequent automated riveting operation of the half shells 1, 1', as a possible alternative to welding.

Figure 4:
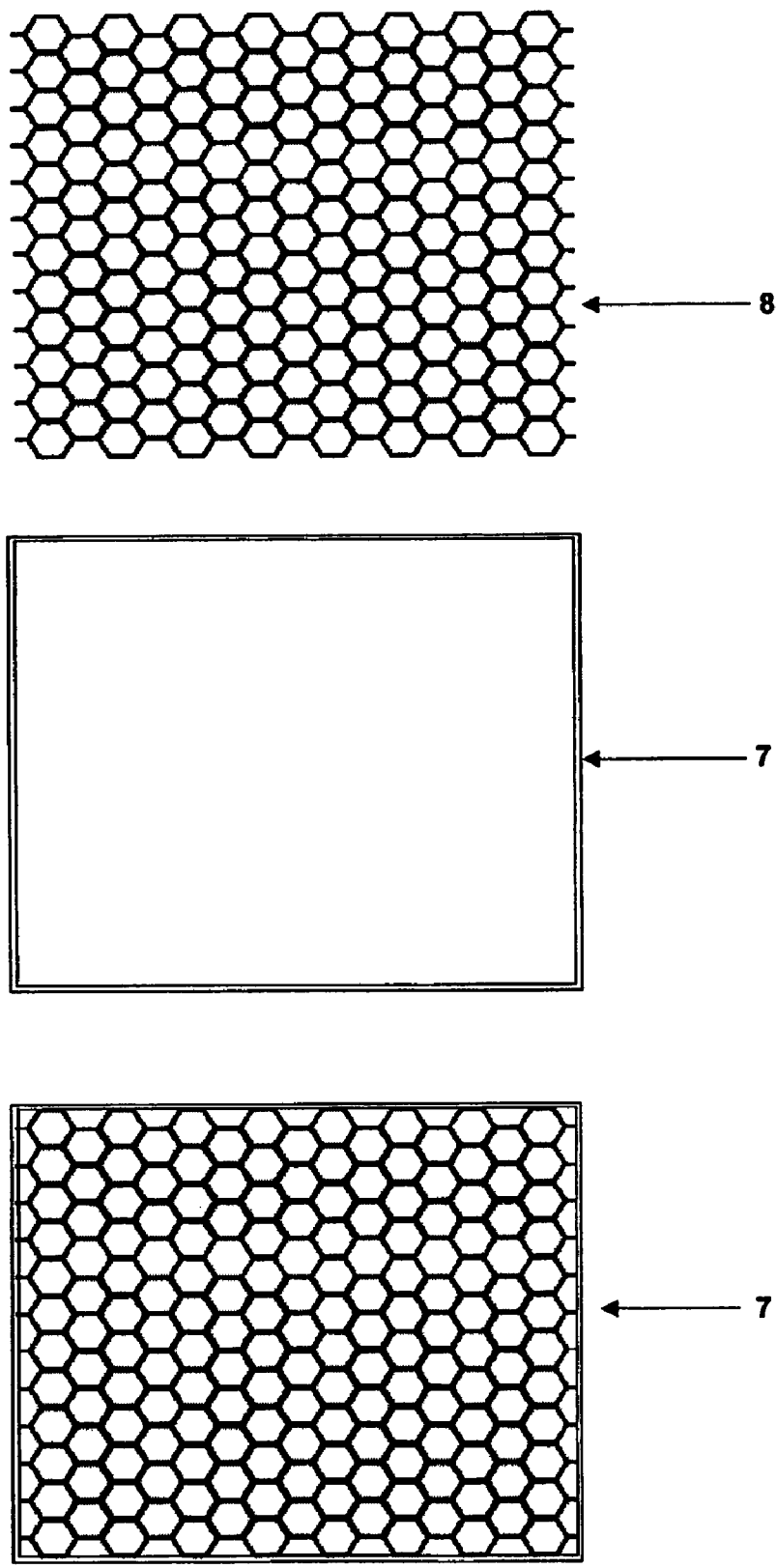
FIG. 4 (section view) shows, above, the finished panel; in the center, a possible frame for arranging around the panel is shown; below, the panel with hexagonal cells is shown inserted in the frame.

FIG. 4 shows how the metal cellular panel 8 in its final form can be assembled in metal frames 7 or frames made of another material.

A particular embodiment will now be described of a possible production plant/process of honeycomb panels of the described type, employing the projection welding process for the fixing of the half shells 1, 1', 1, 1', 1, 1', . . . composing the various layers 2, 2', 2", . . . of the cellular structure 8.

This plant/process was especially achieved for simplifying/speeding up the production, and therefore it is currently considered a preferred solution (even if non-binding with regard to the invention).

Figure 10:
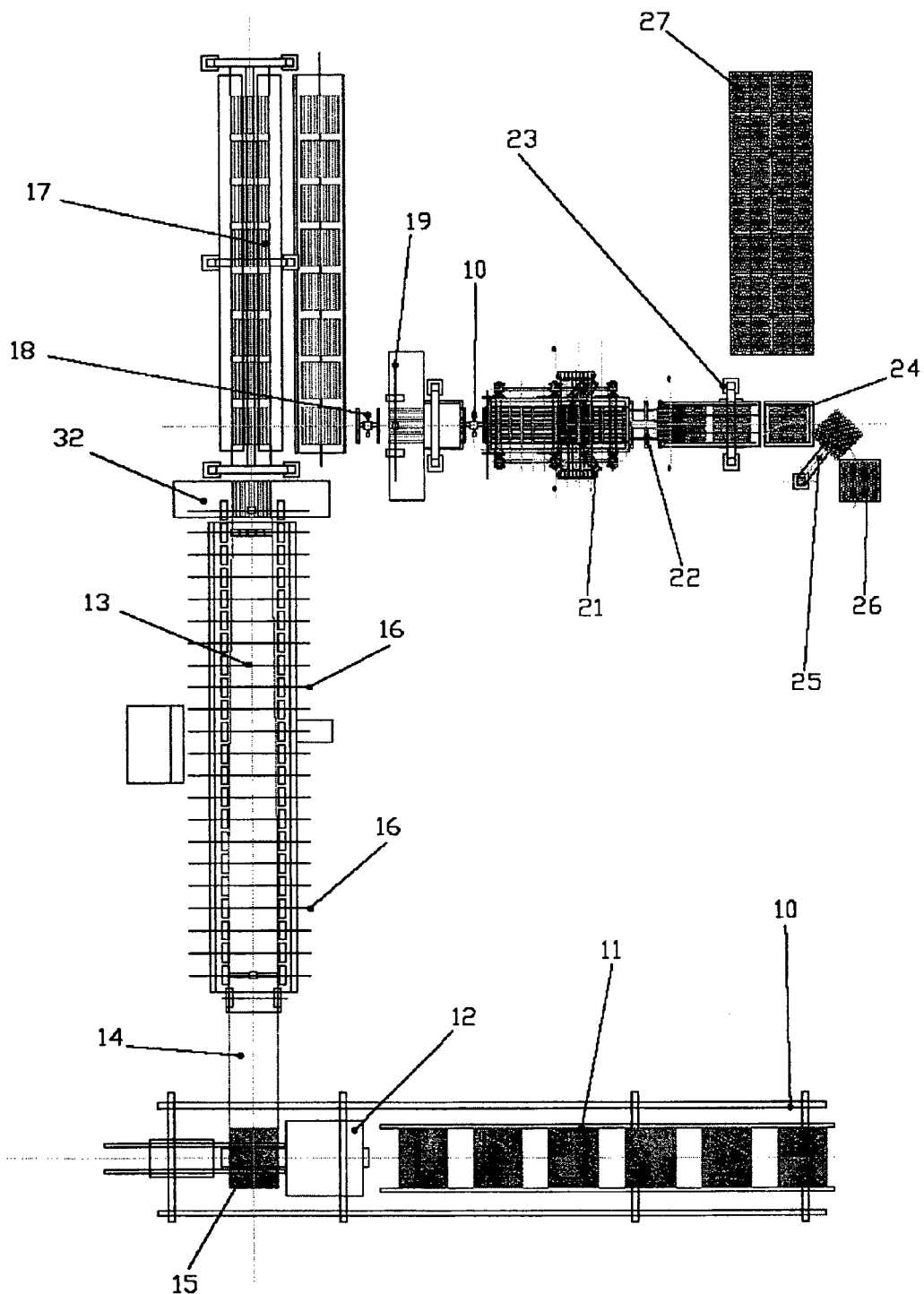
FIG. 10 is a very schematic plan view of a possible production process/plant of the panel of the invention, comprising a roller forming line of the plate fed by a coil.
Figure 11:
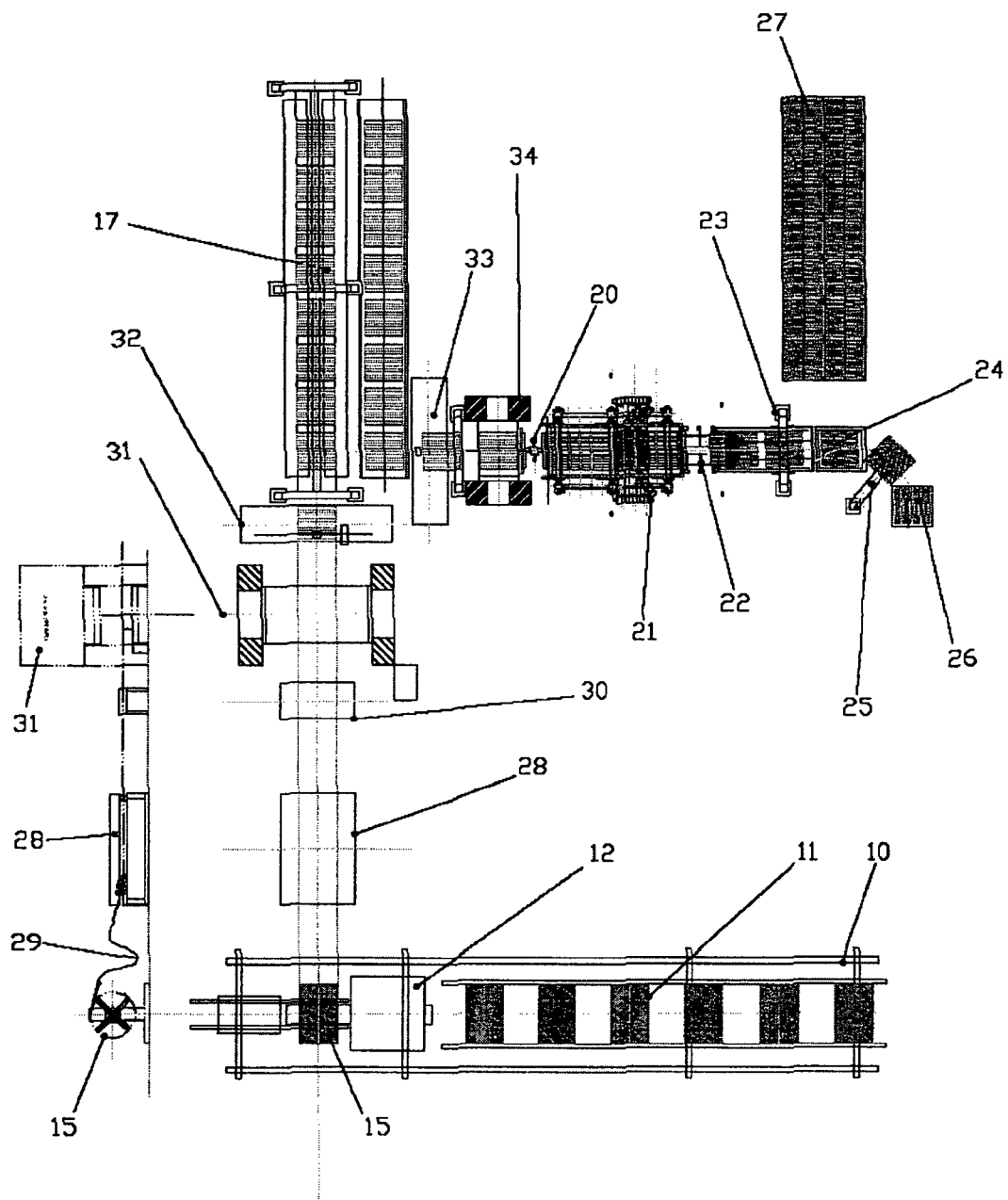
FIG. 11 is an analogous view, in which, however, the roller forming line is substituted by a straightening/stretching machine and by a plate bending and embossing press.

The process will first of all be described by making overall reference to FIGS. 10 and 11, before entering into more detail, especially with reference to the welding.

Figure 12:
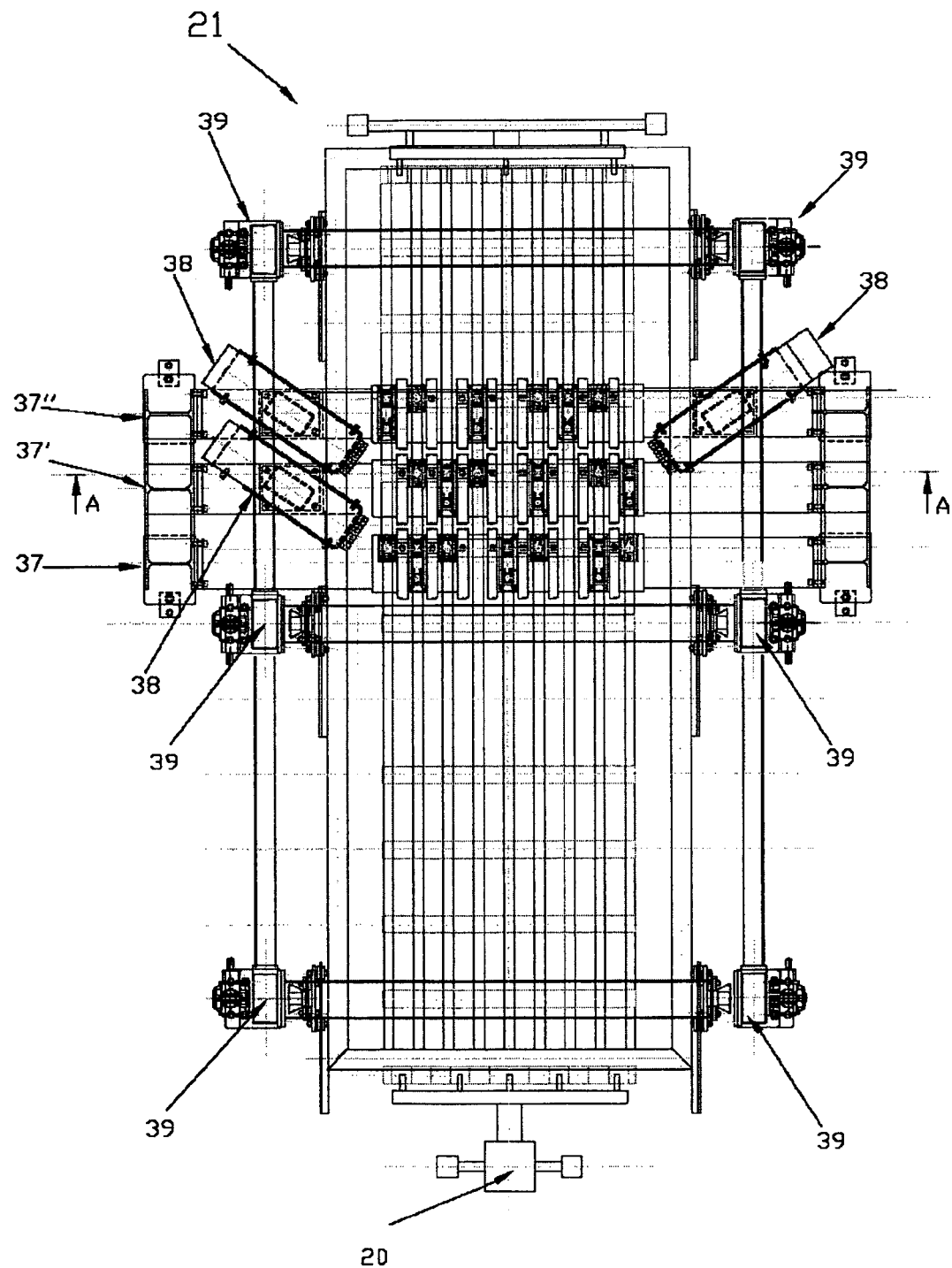
FIG. 12 is a plan view of the half shell pair welding line.
Figure 13:
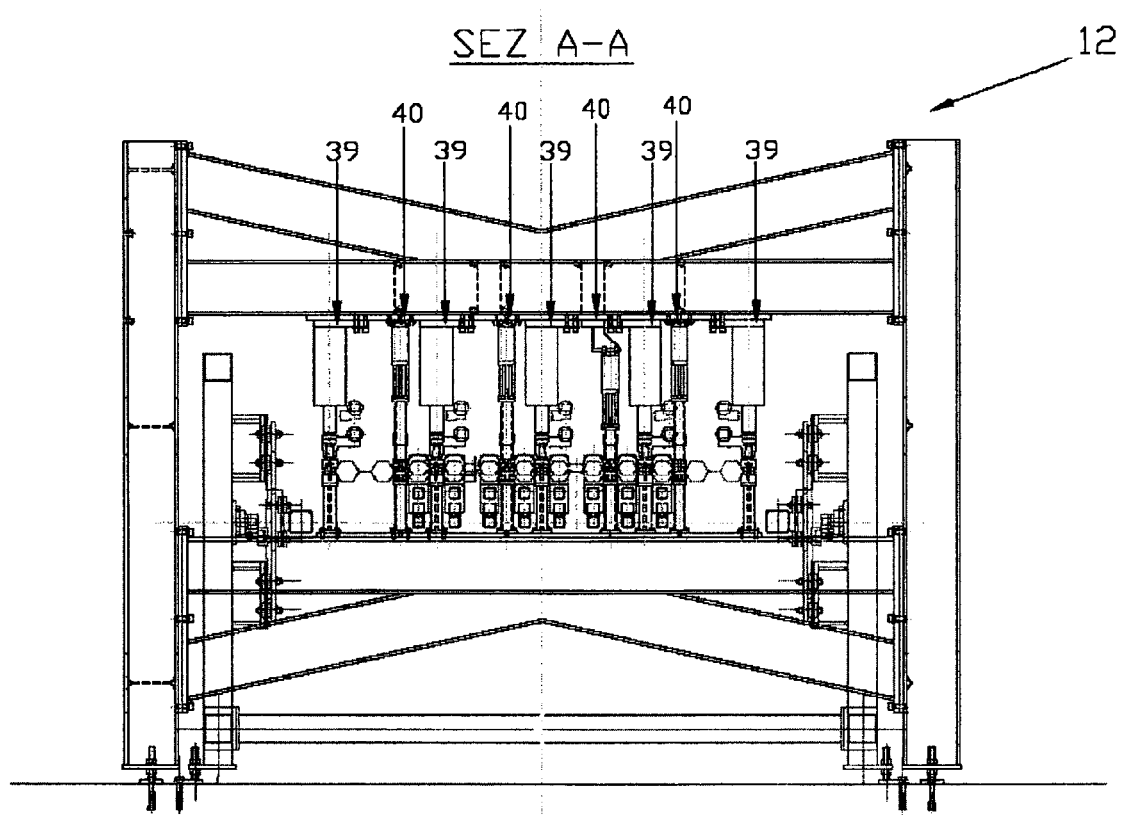
FIG. 13 is the relative section in the vertical plane A-A of FIG. 12.

The plant of FIG. 10 comprises:
a bridge crane 10 for the transport of the (plate) coils;
a coil store 11;
a decoiler 12 which continuously feeds the plate from the respective coil 15 to the roller forming station 13 of the plate 14; the latter (13) is of conventional type and has a plurality of parallel shafts 16, on which the forming rollers are mounted and which are driven by means of a single driving system, by means of respective cardan joints;
a possible automatic storage depot 17 of the corrugated plates (in accordance with the desired form of the cells), cut in pieces of identical length (from the continuous plate) downstream of the roller forming station 13;
an interoperational handling device 18 for loading the plate in the cutting and embossing shearing machine 19 (in order to form the embossments 5); the shearing machine forms the various half shells with the embossments, from the corrugated plate pieces that are loaded thereto;
an interoperational handling device 20 for loading the single half shells 1, 1', 1, 1' . . . into the welding line 21 of the half shell pairs 1, 1' (described below with reference to the FIGS. 12, 13, 14);
an interoperational handling device 22 for loading the pairs of half shells 1, 1' (elementary components of the panel 8) into the panel welding station 23 which operates by adding (welding), always in succession, a further pair of half shells 1, 1' to the part of the panel that has already been welded, until the desired length is achieved;
a storage platform 24 of the single panels 8, with related drawing handling device 25 and a back-up and visual control station 26;
a finishing/painting station 27, if required.

The process provides for the drawing of a coil from the store 11, which is moved by means of suitable systems such as the bridge crane 10, and is sent to the decoiler 12. The coil is unwound and the plate sent to the continuous roller forming line 13. The plate (with the profile defined) is cut to length and stored in the automatic storage depot 17.

On the abovementioned panel welding and assembly line 23, there is a continuous and automatic control system of the welding.

When the assembly process has permitted obtaining a cellular panel 8 of the desired length, the panel 8, by means of an interoperational handling device, is deposited on the storage platform 24.

The process concludes in another, finishing station 27 (protection by means of heat galvanization and subsequent painting station).

It should be observed that the storage depot 17 does not have to be present, and in such case the pieces of plate shaped and cut to length would be directly and continuously sent to the plate cutting and embossing shearing machine 19.

Figure 18:
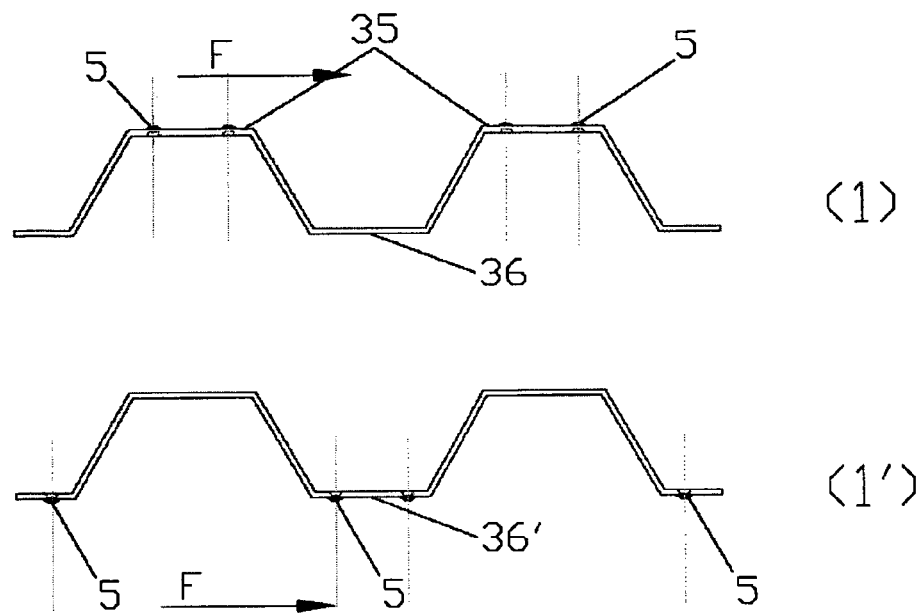
FIG. 18 and FIG. 19 show how to couple the half-shells in order to form a "layer" of the panel (=elementary component), in the pair welding line of FIGS. 12, 13 and 14.

The plant of FIG. 11 is differentiated from that of FIG. 10 in the following points (the parts identical to those of FIG. 10 are instead indicated by the same reference numbers which already appear in FIG. 10):

28=straightening/stretching machine for eliminating the internal tensions of the plate (unwound from the coil 15) before feeding it to the bending and embossing press 31 of the plate;

29=loop formed during the feeding of the plate to the straightening/stretching machine 28, in which the "abundance" of the loop 29 size is continuously regulated with a stepper advancement system 30, which utilizes instantaneous detection sensors of the loop 29 size;

30=stepper feeder;

31=plate bending and embossing press (in this operation, the ribbing or ribs 4, 4', 4" of FIG. 2 may also be formed); the press could be, as a non-limiting example, of CLEARING 400 Ton. type;

32=plate unloading handling device: the continuous plate unwound from the coil 15 is first cut to length in various plates to be deposited in the automated single plate storage depot 17; this can be carried out, for example, by the same press 31 after the achievement of the desired length. It should be noted that the press 31 creates the single profiles transverse to the extension direction of the future half shells (direction F of FIG. 18), one step at a time, for example by forming in each step x crests 35 and x troughs 36, and in the adjacent plate portion, x crests 35' and x troughs 36', and so on, in alternating manner. This signifies that the embossments 5 for the projection welding (not necessary if one employs the automated riveting) are alternatively formed upward or downward in adjacent, not yet separated portions of plate, as shown in FIG. 18, above and below. An analogous process, always in the direction orthogonal to the arrow F, occurs in the case of the plant of FIG. 10, in which the shearing machine 19 cuts the single half shells 1, 1' . . . and simultaneously forms the embossments on the single plates (in this case still without embossments 5) unloaded from the handling device 18 from the storage depot 17. Thus, both in the plant of FIG. 10 and in that of FIG. 11, the subsequent half-shells 1, 1', 1, 1' . . . , before being taken by the interoperational handling device 20 and being deposited on the pair welding line 21, will already have the alternating form 1, 1', 1, 1' . . . shown in FIG. 18, with embossments 5 alternatively turned upward or downward, and moreover offset between one half shell 1 and the next 1'.

This allows, as will be better explained below, coupling the half shells 1, 1' in pairs, in the welding line 21, by simply "overturning" the half shell 1 shown above in FIG. 18, obtaining the welding-ready configuration (shown in FIG. 19), in which a crest 35 is projection welded to a respective crest 35' (thanks to the embossment 5), leaving the embossments 5 on the trough 36' (and the related "troughs 36") available for the subsequent coupling between half shell pairs 1, 1', to be carried out in the panel welding station 23, arranged downstream of the welding line 21 of half shell pairs 1, 1'.

In the plant of FIG. 11, since the embossments 5 have already been formed by the press 31, the step-by-step plate cutting press 34 (for example of CLEARING 300 Ton type) is limited to cutting the single plates one step at a time, obtaining the half shells 1, 1' to be loaded—by means of the interoperational handling device 20—on the welding line 21 of the half shell pairs 1, 1'.

The ribbing or ribs 4, 4', 4" (possibly also at the corners of the single cells) can be formed either by the shearing machine 19 (which also carries out the embossing) in the case of FIG. 10, or by the same bending and embossing press 31 in the case of FIG. 11, or in an independent station, even if the first solution is preferable.

The molds which achieve the profiles 1, 1' are formed by a male part and a female part which penetrate each other. Preferably, small pistons are provided on the female part with opposing internal springs which elastically yield (move back) during the molding at the press, so to avoid an uncontrolled deformation of the plate under the effect of the punch of the male part. In this manner, the required profile is precisely obtained, for example the hexagonal profile of FIG. 18.

The pair welding line 21 and then also the panel welding station 23 will now be described with reference to FIGS. 12-14 and 15-17. It is noted, however, that such descriptions are only exemplifying and non-limiting with regard to the coupling process of the single half-shells 1, 1' . . . constituting the panel 8 of the present invention. Moreover, the flexibility of the process is also evident from the following description, with regard to the adjustments of the electrode positions of the various welding guns, so that the process can be adapted at various distances between the single cells (different pitches) and various thicknesses of the panel 8.

Figure 14:
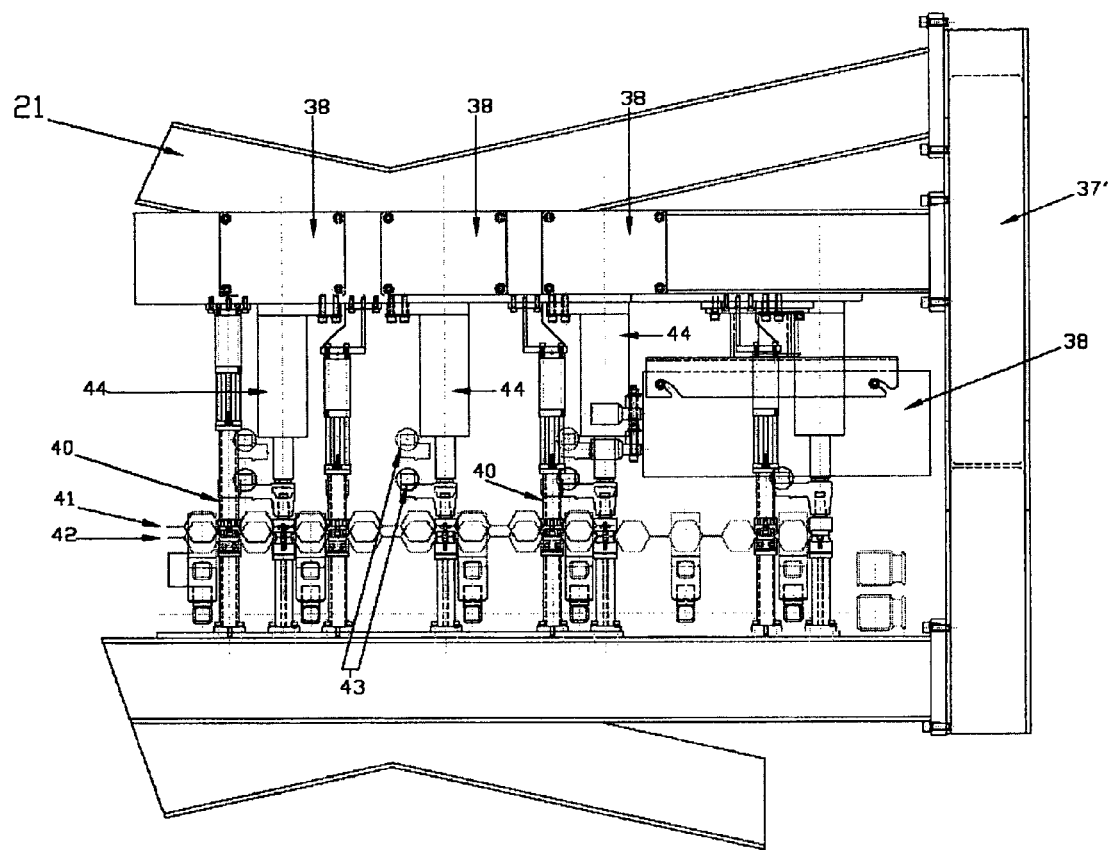
FIG. 14 is an enlarged detail of FIG. 13.
Figure 19:
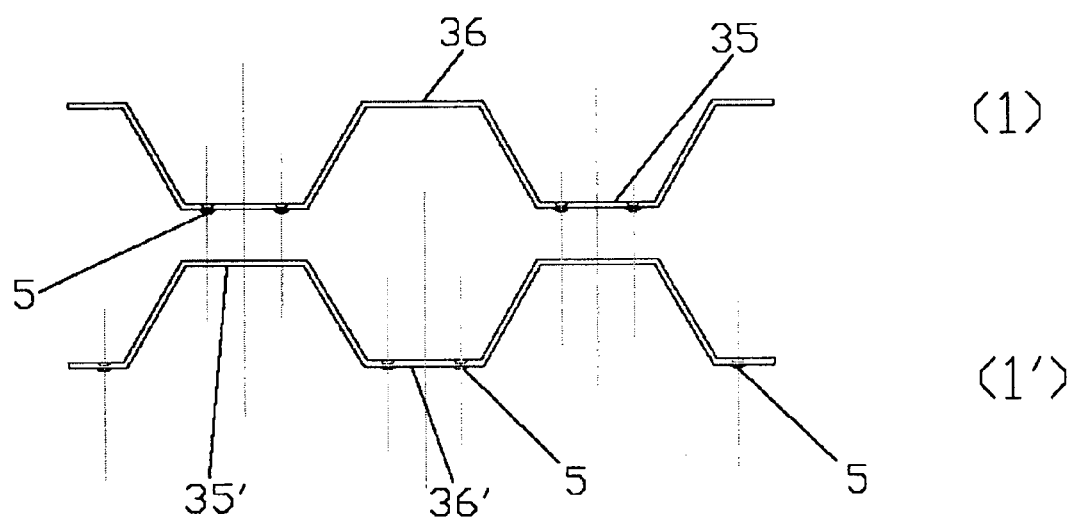

Once the half shells 1, 1' are loaded on the welding line 21 of the pairs, which in the example comprise three stations or portals 37, 37', 37", the single half shells 1, 1' are prearranged (in pairs) for carrying out the welding in the configuration of FIG. 19 (see above). It is observed that in every portal, three welds are carried out in an offset manner for three respective cells, so to have (in this embodiment) nine welds overall. This allows optimizing the times and the bulk, also considering the spaces required of the welding transformers 38. A relative transformer 38 is associated with a relative welding point. The references 39 are lift and shift drive transmissions for the pairs of half shells 1, 1'. The line 21 is an electro-welded structure with portal or framework in which (see FIG. 13) the various transformers 38 are aligned and flanking a related blank holder 40. It is seen in the drawing of FIG. 14 that the raised position 41 of the pair 1, 1' of half shells is that of advancement between a welding seat associated with one of the welding stations (37-37"), and the successive positioning seat of the pair 1, 1', in order to carry out the welding in the subsequent welding station. Of course, when a pair 1, 1' of half shells is situated in one station (lowered position 42 on the seat), the next pair is situated in the preceding station, and so on. Thus, the line 21 simultaneously carries out the welding on various pairs 1, 1' which follow each other, according to the number of provided stations 37, 37', . . . The reference number 43 indicates large (plaited) copper cables for bringing the electrical current from the respective transformer 38 to the welding electrodes (four of them if there are 4 embossments 5) placed at the lower end of the stem of the relative pneumatic welding piston 44. The current passes from the electrodes towards the seat in accordance with the projection welding principle. In other words, the embossments 5 of the surfaces 35 (of the shell 1) in FIG. 19 make the current pass towards the surface 35' of the lower half shell 1' set on the copper seat of the respective welding station, and thus inside the same seat (the latter naturally copies the profile of the lower half shell 1' of FIG. 19).

Figure 15:
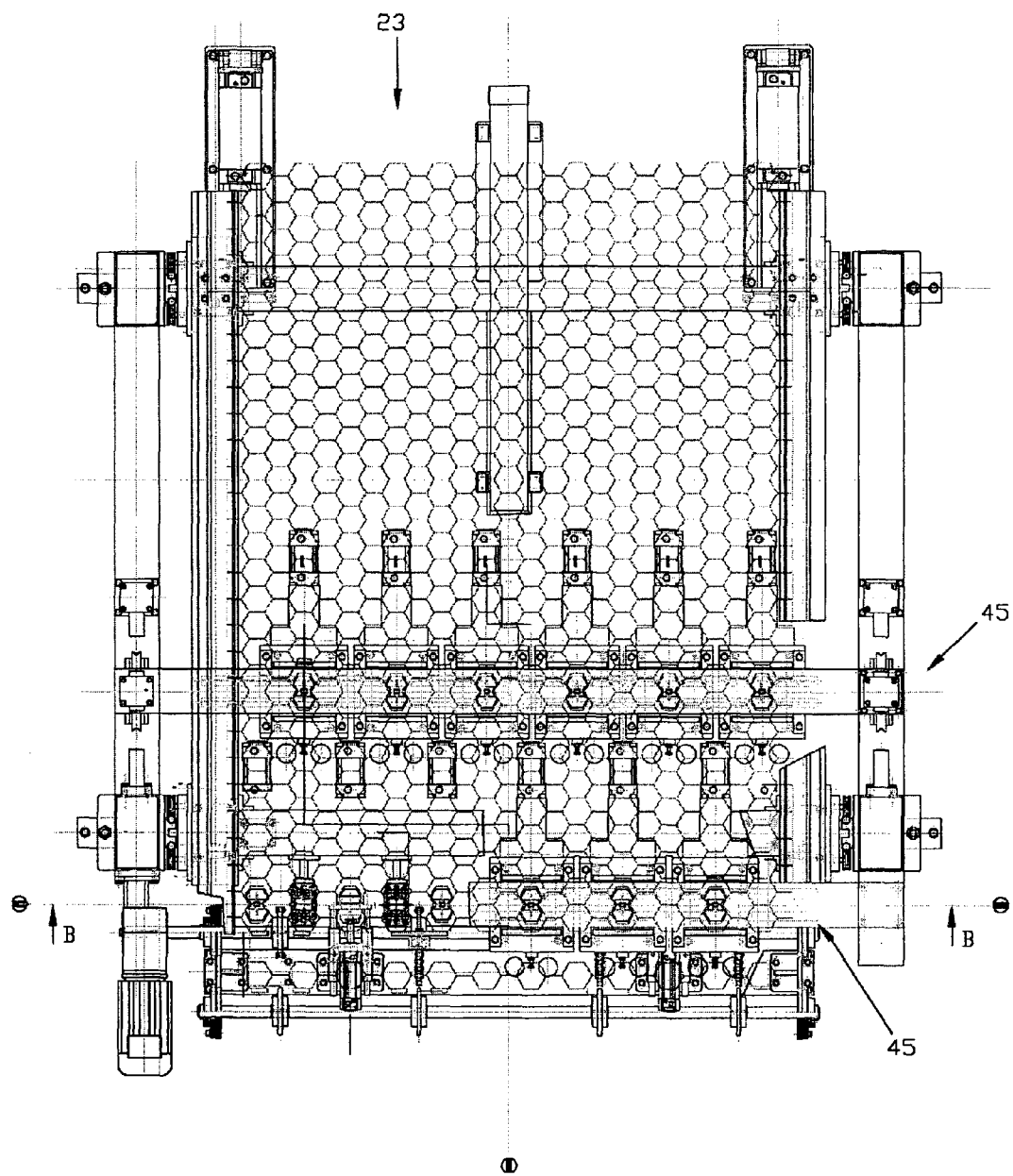
FIG. 15 shows, in plan view, the welding line of the panels, in order to weld (add) a pair of half-shells each time to the remaining, already-welded part of the panel being formed.
Figure 16:
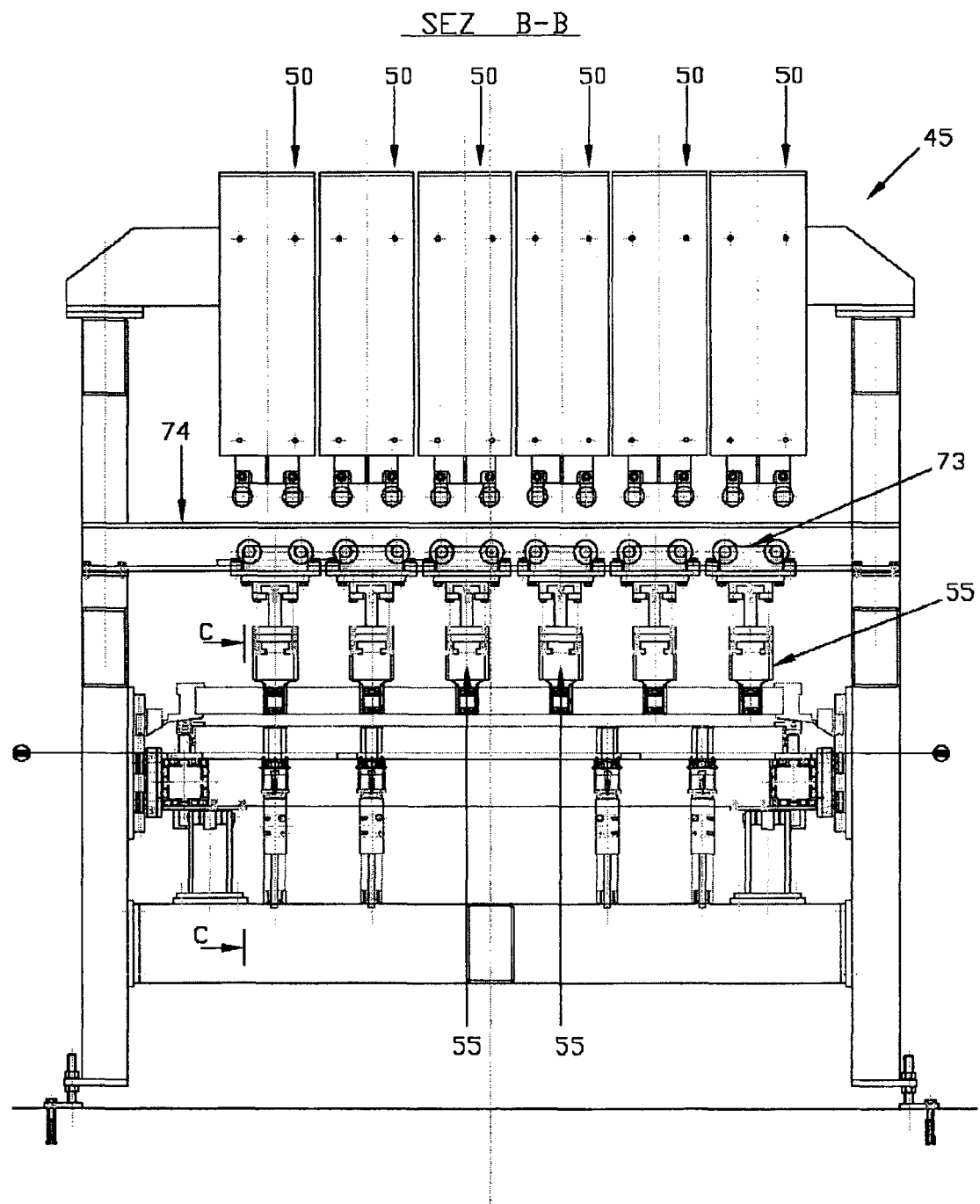
FIG. 16 is the relative section in the vertical plane B-B of FIG. 15.
Figure 17:
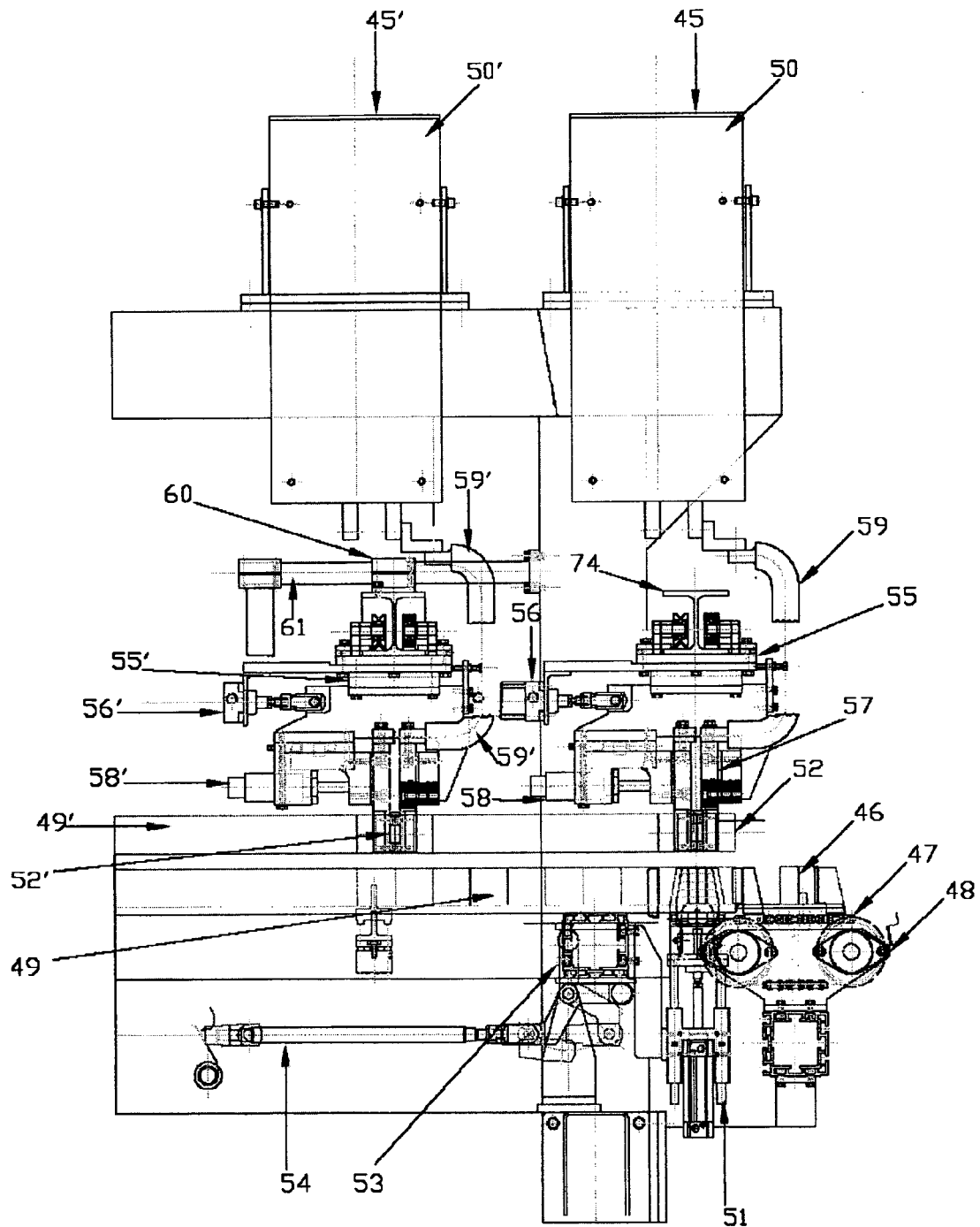
FIG. 17 shows an enlarged detail, in the direction of the plane C-C of FIG. 16.

Once all of the welding has been carried out for all the cells, the half shell pair 1, 1' is conveyed to the next station, shown in FIGS. 15, 16 and 17. The interoperational handling device 22 deposits a pair 1, 1' in the panel welding station 23.

FIG. 15 shows the plan view of the panel welding station 23. It is an electro-welded station comprising a first welding portal 45 and a second welding portal 45'. The pair of half shells 46 (half shell pair 1, 1' already welded together) is set on one side, i.e. inserted by the interoperational handling device 22 with the geometric axis of the cells vertically directed, on the feed chain 47 moved by two toothed pinions 48, 48 (see FIG. 17 =section C-C of FIG. 16). It is observed that in FIG. 17, in the panel 49 being formed (=pair set 1, 1' already welded together in the portal 45), the various half shell pairs 1, 1' are all extended (like the pair 46 already to be welded to the panel 49) in a direction orthogonal to the drawing plane.

In addition, the (first) portal 45, to which the row of transformers 50 belong, serves to weld the pair 46 (just fed) to the panel 49 being formed, in the "positions of the odd-number planes 36, 36'''" (see FIG. 19) facing each other, in which one crest 36' belongs to the panel 49 and the other, 36, to the pair 46 to be added (welded) presently, while the (second) portal 45' to which the transformer row 50' (FIG. 17) belongs, serves to weld said crests 36, 36' in the "even-number" positions, in order to complete the welding of the new pair 46 to the panel 49 being formed.

We will now describe this welding process between panel pairs in more detail, with reference to FIGS. 16 and 17.

In FIG. 17, the pair 46 which has reached the position of a slide 51 with piece-locking gripper is lifted and locked in the position 52 to the panel 49 which in the meantime was also lifted (by a leverage mechanism 54 for lifting a panel 49 carrier frame 53). In its raised position 49', the panel 49 is situated at the same height (level) as the position 52 of the pair 46 lifted by the slide 51 with piece-locking gripper, so that the latter can easily lock the panel 49' to the pair 46 in the position 52. In the positions 52, the electrodes of the self-centering welding guns 55 belonging to the first portal 45, crossing the related cells, are arranged in odd-number positions on opposite sides of the small surfaces 36, 36' "of the crests" and weld these surfaces to each other.

Simultaneously, the next row of self-centering welding guns 55' belonging to the second welding portal 45' of the even-number surfaces 36, 36' carries out the welding of the even-number surfaces 36, 36'. Everything advances one step at a time with a step-by-step translation and lifting movement. Once the second portal 45' has been passed, the welding is carried out over all the cells of the panel being formed. When the panel 49 has reached the pre-established length, on the basis of a suitable sensor, the welded panel 8 will be deposited on the storage platform 24 and the drawing handling device 25 will draw, if necessary, one panel at a time for carrying out a visual control of the panel. In a station 27, the galvanizing, painting or other finishing works can be carried out on the panel 8.

Returning to FIG. 17 and FIG. 16, we will describe several characteristics which make the process particularly flexible.

The welding guns 55 of the first row 45 comprise a first piston 56 fixed to the gun structure, which by means of traction brings the right electrode carriers 57 in the direction of the arrow P closer to the left electrode carriers 57, the latter being driven—in the opposite direction to that indicated by the arrow P—by a second pneumatic (thrust) piston 58, by means of the related stem. In such a manner, the electrodes (which are already found inside the respective cells), approach the surfaces 36, 36' to be welded. The current is sent through the copper plaited cables 59; passing through the right electrode carrier 57, it reaches the right electrodes and then, after having crossed through the embossments 5 and the surfaces 36, 36', it reaches into the left electrode 30 carriers 57, closing the circuit.

The reference numbers of the components just described, but related to the self-centering welding gun row of the second portal 45', are indicated with primes. They function with the same principle. The welding in the even-number positions (of the surfaces 36, 36') of a pair 46 already previously welded in the odd-number positions, occurs in the position 52'.

The guns 55 and 55' can slide on relative horizontal tracks 74 of the portals 45 and 45', respectively, along the longitudinal extension of the pairs 1, 1', and therefore they allow an adaptation of the positions of the guns in this direction when the pitch between the cells is varied for manufacturing a panel with other characteristics.

The welding guns 55 and 55' have wheels mounted on the relative gun carrier trolley 73 which slides on the respective horizontal track 74. One of these wheels has a triangular profile in order to guide the related welding gun in a precise manner, without transverse sliding. It is noted that the term "welding gun" 55 (or 55') comprises all the components 56, 58, 57 (or 56', 57', 58').

In addition, a respective adjustable locking system 60 allows moving the single self-centering welding guns 55' of the portal 45' along a corresponding stationary tube 61 fixed to the structure, locking the relative gun 55' in a desired horizontal position along a direction orthogonal to the pairs of half shells 1, 1'. This allows adapting the process to the situations in which the cell height is varied.

These expedients confer considerable flexibility to the process.

It is noted that the process can be modified in various ways. For example, the plate storage depot 17 could be absent, and in such case the sheared plates would be directly fed either to the shearing machine 19, or to the step-by-step plate-cutting press 34. Nevertheless, it is preferable to arrange a storage depot 17, since the plant becomes more flexible in the case of anomalies in other parts of the same. For example, if a breakage is verified at the roller forming line 13, this would not affect the functioning of the plant downstream of the automatic plate storage depot 17. It can thus be seen that, according to the technical objectives, the plant can be modified by a man skilled in the art without difficulty, starting from the technical teachings contained in the present patent application.

Below, a possible use of the panel (constituting a semifinished product) will be described as a merely illustrative example according to the present invention. With reference to FIGS. 5-9, the use of the panel 8 is illustrated in an impact energy attenuator or decelerator (or impact energy absorber).

Cellular Panel Used as Energy Absorber in Impact Situations

As seen, the applicant has developed a process for the automated manufacturing of cellular panels. Such panels are obtained from metal plate sheets which undergo, in succession, the molding, shearing and welding processes.

The manufacturing process is such that it allows the modulation of the shape and size of the cell as well as the size of the same panel. It is thus possible to make panels with cells of square, rhomboid, hexagonal shape, etc. The starting plate can have any one cell thickness and the size and panel can be varied according to the use needs.

A structure of cellular type achieved by means of a ductile material has a high capacity for being plastically deformed. A system of this type is therefore capable of absorbing high amounts of energy in the form of plastic deformation internal energy.

The invention and innovation consist in particular in the use of such cellular panel as a system capable of transforming kinetic energy into plastic deformation internal energy, in the context of impact situations.

For example, a regular hexagonal structure, when subjected to sufficiently high loads, undergoes the buckling phenomenon (structural instability) and begins to be plastically deformed at the bends. The plastic deformation can proceed until the cells have completely collapsed on themselves (the initially open and cellular structure becomes a closed structure, upon completed deformation).

The flexibility of the preceding manufacturing process of the cellular panel allows designing the panel such that it is capable of absorbing the required energy amount. Depending on one's needs, it is possible to adjust the thickness, the size of the cells and the height of the panel.

An analysis of the finished elements was carried out by means of the commercial code LS-DYNA in order to evaluate the behavior of the cellular panels, when these are used in impact situations as decelerators. In particular, the behavior of five parallel panels with hexagonal cells (see FIG. 5) was evaluated, when a rigid mass of 1000 Kg hits these at a speed of 25 Km/h. The performances of such system were compared with those of an oil-pressure decelerator of ENIDINE currently on the market, capable of absorbing the same level of kinetic energy.

Such system was modeled by means of shell elements with four nodes with three degrees of freedom per node. The panel is composed of Fe 360 B material, which was modeled with a bilinear behavior.

The body which falls with a speed of 25 Km/h was modeled as a rigid body.

Figure 6:
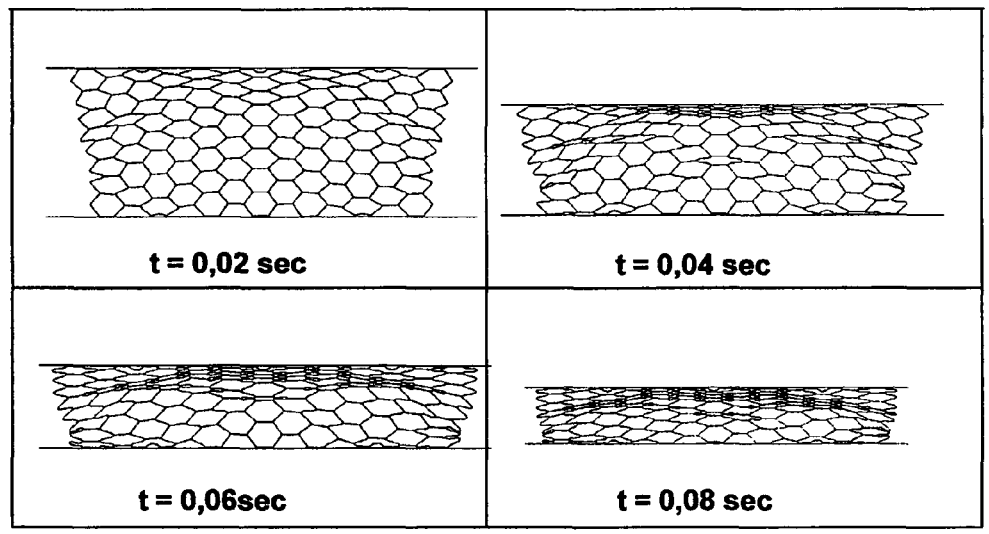
FIG. 6 shows the progressive deformation, in various time instants, of the decelerator shown in FIG. 5.

In FIG. 6, the time progression is reported of the deformation sustained by the decelerator of the invention after the impact with the 1000 Kg body. It is noted that the deformation of the panels is progressive and regular. The cells are deformed until they collapse on themselves. Such regularity of the deformation ensures that the panel slows the impacting body with a nearly constant deceleration, as is observed in FIG. 7. The performances of a system of such type are thus very close to those of an ideal decelerator characterized by a constant deceleration value.

Figure 7:
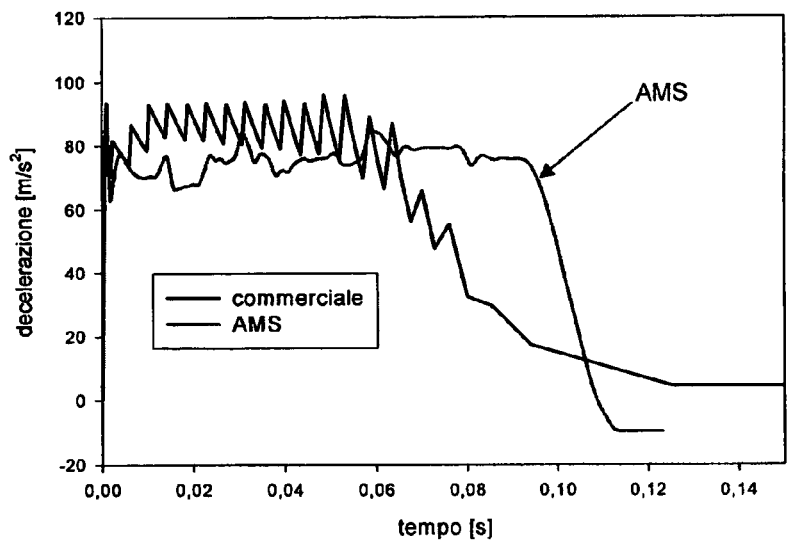
FIG. 7 shows the deceleration as a function of the time for the decelerator of the present invention shown in FIG. 5 (clear curve) and for a (conventional) oil-pressure ENIDINE decelerator (dark curve)

In order to compare the performances of the decelerator of the invention with a commercial decelerator, FIG. 7 reports the progression of the decelerations sustained by the 1000 Kg body both for the decelerator of the invention and for the conventional decelerator of ENIDINE of equivalent travel and designed for an impact with a 1000 Kg body at 25 Km/h.

FIG. 7 shows the deceleration as a function of time for the decelerator AMS of the invention and for the oil-pressure decelerator of ENIDINE.

As is seen in FIG. 7, the deceleration for the system proposed by the present invention (AMS) is characterized by smaller oscillations with respect to the commercial decelerator. In addition, the maximum value of such decelerations is lower for the system of the invention (AMS) than it is for that currently on the market. Such feature is of particular importance if the decelerator is employed in the cases where the decelerations also involve people (as in the case of the elevator safety systems). In the applicant's laboratory, impact tests were also carried out with a heavy body of 1200 Kg mass on hexagonal cell panels at a speed of 15 Km/h. The deformation of the cellular panels in subsequent time instants was progressive and regular. The plastic deformation is such to make the cells collapse on themselves without causing any breakage of the panel itself.

Figure 8:
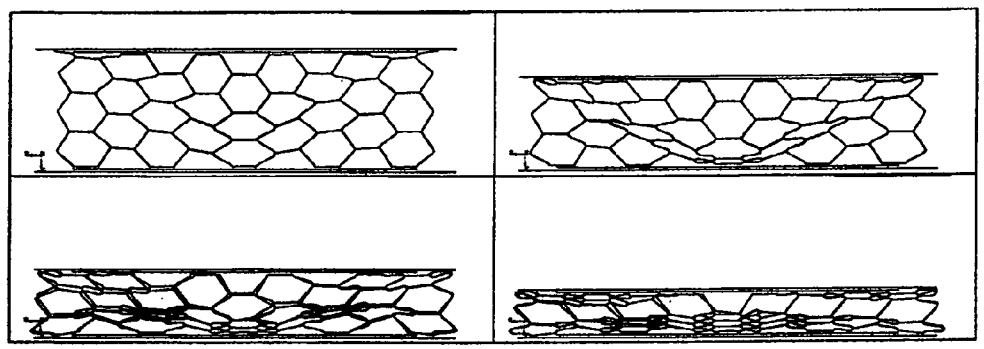
FIG. 8 shows the results of the FE (finite elements) calculation, with regard to the progressive deformation of the cellular panels.

An analysis of the finished elements was also carried out by means of the commercial code LS-DYNA, in order to simulate the impact test made in the AMS lab. FIG. 8 reports the deformation of the cellular panel in subsequent time instants by means of the code FE.

FIG. 8 shows a good correspondence between the deformation mechanism evaluated through the experimental test and that provided by the simulation.

Figure 9:
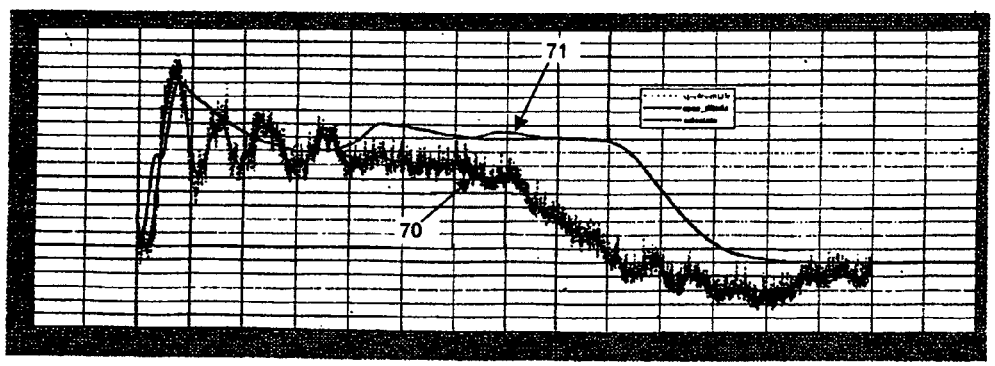
FIG. 9 shows a comparison diagram of the decelerations (experimentally measured by an accelerometer) sustained by a heavy body in free fall, allowed to respectively hit an absorber (decelerator) of the present invention and an absorber (decelerator) of commercial type (ENIDINE) with equal travel, also designed for an impact of 1000 Kg at 25 Km/h.

The experimental test permitted evaluating the deceleration of the impacting body by means of an accelerator mounted on such body. FIG. 9 shows the deceleration of the impacting body evaluated by means of the experimental test and the same deceleration evaluated by means of the finished element code. A good correspondence is observed between the experimental test 70 and the simulated test 71.

Finally, the cellular panel is a system capable of attenuating impact. It is capable of gradually transforming the kinetic energy of the impacting body into plastic deformation internal energy. The gradual and regular mode with which the cellular panels of the present invention are deformed are such to allow a nearly constant deceleration of the impacting body, rendering the system composed by the cellular panels very close to being an ideal decelerator.

The single panels 8, 8', 8'' . . . of the absorber can be spaced or brought close to/fitted with each other, and metal plates or other elements can be provided between panels (according to another embodiment).

The single panels of the attenuator can also be composed of cells with ribbing or ribs 4, 4', 4'' (see FIG. 2), also possibly formed at the corners of the single cells. All of these modifications enter within the scope of the present invention.

Reference Number List 1, 1' half shells
2, 2' pairs of half shells (panel "layers")
3 half shell (1, 1') surfaces in contact with each other
4, 4', 4'' ribs of the cells
5 projection welding embossments
6 riveting holes
7 panel frame
8, 8' . . . metal cellular panels
10 bridge crane for coil transport
11 coil store
12 decoiler
13 roller forming line
14 plate unwound from the coil 15
15 coil
16 shafts of the rollers
17 automatic plate storage depot
18 interoperational handling device
19 plate cutting and embossing shearing machine
20 interoperational handling device
21 pair welding line
22 interoperational handling device
23 metal cellular panel welding station
24 storage platform
25 drawing handling device
26 back-up and visual control station
27 finishing station
28 straightening/stretching machine
29 loop of the plate 14
30 stepper feeder
31 plate bending and embossing press
32 unloading handling device
33 loading handling device
34 step-by-step plate cutting press
35, 35' crests of the half shells 1, 1'
36, 36' troughs of the half shells 1,1'
37 first welding station/portal for half shell pairs
37' second welding station/portal for half shell pairs
37'' third welding station/portal for half shell pairs
38 transformers of the welding line 12
39 lift and shift drive transmissions
40 blank holder
41 raised advancement position
42 lowered welding position
43 copper plaits
44 pneumatic cylinder
45 first panel welding portal
45' second panel welding portal
46 pair to be weld (feed position)
47 chain

The invention claimed is:

1. A metal cellular panel composed of a plurality of cells, the metal cellular panel used for making impact resistant products, the metal cellular panel comprising:
    a plurality of half shells of plate strips shaped in a periodic manner, having a repeated profile, and being fixed together in pairs so as to produce the plurality of cells;
    all contact points between the half shells or between single cells thereof, respectively, being fixed to each other, a height of the cells, measured in an axial extension direction corresponding to a thickness of the metal cellular panel, said height being reduced such that the thickness ranges from less than to at most substantially equal to a maximum diameter of the cells, to allow a facilitated deformation in a plane defined by the cells; and,
    reinforcement ribs extending towards corners of each single half shell to provide greater compressive strength.

2. The metal cellular panel of claim 1 wherein the contact points are fixed by being welded or riveted together.

3. A process for manufacturing a metal cellular panel used for absorbing impact energy comprising the steps of:
    unwinding a metal plate from a coil;
    plastically deforming the metal plate in a bending and/or embossing press placed downstream of a straightening/ stretching machine for eliminating an inner tension in the metal plate unwound from the coil;

cutting the plate into section bar strips constituting a plurality of half shells;

coupling together at least two bar strips, each strip having a plurality of half shells for forming multiple cells, the cells having a reduced axial height (p) being at most substantially equal to a maximum diameter of the cells;

fixing all contact points between the half shells and the cells, so as to form a metal cellular panel; and, at the same time as the deforming step, forming ribs on each single cell, the ribs extending towards corners of each shell for reinforcing the panel so that the metal panel has increased compressive strength.

4. The process according to claim 3, wherein the fixing of the half shells occurs by spot or continuous welding with an automatic welding system.

5. The process according to claim 3 further comprising, before the fixing step, forming embossments on walls of each crest/trough of each half shell and fixing the half shells using self-centering welding guns and/or electrode carrier pneumatic pistons.

6. The process according to claim 3, characterized in that the fixing of the half shells occurs by forming holes on the half shells and inserting fixing rivets.

7. The process according to claim 3, further comprising obtaining the metal plate by drawing a coil from a store of coils, and unwinding the coil by means of a decoiler, said decoiler being composed of a steel structure, electro-welded with a self-centering, four-sided mandrel.

8. The process according to claim 3 wherein the plastic deformation of the plate occurs by moving rollers using an electric motor, a drive reduction gear, and respective cardan joints.

9. The process according to claim 3 wherein the reinforcing ribs are also formed on the plate.

10. The process according to claim 3 wherein the cutting for obtaining the single strips of plate which form the half shells occurs in a plate cutting and embossing shearing machine.

11. The process according to claim 3 wherein the cutting for obtaining the single strips of plate which form the half shells occurs in a step-by-step plate cutting press.

12. The process according to claim 3 wherein the fixing of the half shells occurs adjustably with regard to a position thereof, for adapting to different pitches between the cells and to different heights of the cells of the panel to be formed.

13. The process according to claim 12, wherein the fixing of the half shells occurs using self-centering welding guns mounted on trolleys slidable on tracks which extend in a direction parallel to an extension of the half shells to be welded.

14. The process according to claim 13, further comprising horizontally adjusting the tracks position in an orthogonal direction with respect to the extension of the tracks.

15. The process according to claim 3 further comprising fixing the plates in pairs, after which each pair is then fixed to a preceding pair of fixed half shells and repeating until a final desired length of the panel is reached.

16. The process according to claim 15, wherein the fixing occurs by projection welding.

17. The process according to claim 15, wherein the fixing of the half shells occurs in offset positions between the cells.

* * * * *